United States Patent Office 2,842,515
Patented July 8, 1958

2,842,515

ORGANOPOLYSILOXANE ELASTOMER AND METHOD OF MAKING

Maynard C. Agens, Schenectady, N. Y., assignor to General Electric Company, a corporation of New York No Drawing. Application May 21, 1954
Serial No. 431,598

9 Claims. (Cl. 260—37)

This invention relates to a process of making a solid elastic, curable organopolysiloxane, which process comprises (1) heating a liquid methylpolysiloxane having an average of from 1.9 to 2.0 methyl radicals per silicon atom with from 0.5 to 15 percent by weight of a dialkyl phosphite, (2) aerating the product of (1) with a moist inert gas to form a semi-solid product, and (3) compounding one part by weight of the aforesaid product with from 0.1 to 1 part by weight of carbon black and from 0.05 to 0.5 part by weight of zinc oxide. This invention also relates to the curing of the product prepared by the above process to form a carbon black filled methylpolysiloxane rubber which has a high tensile strength, elongation, and tear resistance.

Heretofore, attempts have been made to prepare carbon black filled silicone rubbers using readily available organopolysiloxane oils. However, these attempts have generally resulted in elastomers having unacceptably low tensile strengths, tear resistances and elongation properties. These carbon black filled products are desirable in applications where a high temperature, conducting rubber is necessary. For example, a conducting rubber may be used to form a flexible heater by attaching electrical contacts to a strip of the rubber and passing a current through the rubber to heat it up to a temperature below the decomposition temperature of the rubber.

I have discovered that a conducting methylpolysiloxane rubber with a carbon black filler may be prepared by reacting a dialkyl phosphite with a methylpolysiloxane fluid, passing a moist inert gas through the reaction mixture, and compounding the resulting gum with carbon black and zinc oxide. A rubber prepared by this method avoids the use of peroxide cross-linking catalysts which leave acid decomposition products such as benzoic acid in the finished rubber. These acids tend to attack the rubber at high temperatures and cause some reduction in the molecular weight of the rubber.

The methylpolysiloxane fluids having an average of 1.9 to 2.0 methyl radicals per silicon atom which are used for the practice of the present invention may comprise any of the methylpolysiloxanes coming under this classification. Thus, such methylpolysiloxanes may be obtained by the hydrolysis of hydrolyzable methylsilanes followed by complete or partial condensation of the hydrolysis product. They may also be prepared by hydrolyzing mixtures of hydrolyzable methylsilanes wherein the average number of methyl radicals per silicon atom is within the ratio of from about 1.9 to 2.0. More specific directions for the hydrolysis of hydrolyzable methylsilanes to form liquid methylpolysiloxanes may be found, for instance, in Patnode Patents 2,469,888 and 2,469,890 and Patnode applications, Serial Nos. 463,813 and 463,815, both now abandoned, filed October 29, 1942, the foregoing applications being assigned to the same assignee as the present invention. Attention is also directed to the book "Introduction to the Chemistry of the Silicones," by Eugene G. Rochow, second edition, published by John Wiley & Sons (1951), for additional information as to methods for hydrolyzing hydrolyzable methylsilanes.

By the term "hydrolyzable methylsilanes" is intended to mean derivatives of silanes which contain hydrolyzable groups or radicals, e. g., halogens, amino groups, alkoxy, aryloxy, and acyloxy radicals, etc., in addition to the organic groups attached directly to the silicon by carbon-silicon linkages.

One method of forming the liquid methylpolysiloxanes used in the present invention is by hydrolysis and condensation of a mixture of dimethyldichlorosilane and monomethyltrichlorosilane. The ratio of methyl radicals to silicon atoms in the final product is controlled by the relative proportions of difunctional and trifunctional siloxane units present in the product.

The dialkyl phosphites used in the present invention have the formula (1)  $(RO)(R'O)POH$ where R and R' are members selected from the class consisting of alkyl radicals, e. g., methyl, ethyl, propyl, butyl, octyl, etc., radicals.

As the first step in the process of the present invention the methylpolysiloxane having a ratio of from 1.9 to 2.0 methyl radicals per silicon atom is mixed with from 0.5 to 15 percent by weight of the dialkyl phosphite and the mixture is heated to effect reaction between the ingredients. The preferred method of effecting this reaction is to heat the reaction mixture at reflux temperature for several hours to insure complete reaction of the ingredients. The reflux temperature varies in accordance with the particular methylpolysiloxane used, with the concentration of dialkyl phosphite used and with the particular dialkyl phosphite used. In general we have found that the reflux temperature is usually in the range from about 150 to 200° C. Instead of effecting the reaction at the reflux temperature, it is also possible to heat the reaction mixture at a point below reflux, but this results in a decrease in the reaction rate. After the reaction has taken place, it is sometimes desirable to distill off any volatile material by bringing the temperature of the reaction mixture up to about 250° C. However, we have found that a satisfactory rubber may be formed by the process of our invention even when this distillation is omitted. The product of this reaction is a liquid at room temperature and the viscosity of the liquid increases as the percent of dialkyl phosphite decreases.

The second step in the process of the present invention is to moisten the phosphite treated liquid to increase the viscosity until a semi-solid product is formed. The term "semi-solid product" is used to refer to a product whose viscosity is such that a gas bubble introduced at the bottom of a layer of the product will not bubble up through the product. Preferably, this moistening is carried out by passing a moist inert gas at room temperature and atmospheric pressure through the phosphited liquid until the viscosity of the liquid is increased to such a point that the gas will no longer pass through the liquid. The gas may be moistened by any suitable means, such as by passing the inert gas through water to increase its relative humidity up to about 100 percent. Relative humidities below 100 percent may be used, but in this case a longer period of time is required to cause the increase in viscosity. The gas which is used as a moisture carrier may be any gas which is inert with respect to the phosphite treated methylpolysiloxane. The ideal gas is air because of its availability. Other gases which may be used include, for example, nitrogen, hydrogen, methane, helium, argon, etc. In general, the moist inert gas may be passed through the phosphited product for from two to six hours before the viscosity increases to such a point that the gas cannot pass through.

In addition to introducing the moisture into the product by means of an inert gas carrier, it is also possible to moisten the product by adding water to the product and stirring the mixture. However, this method has the disadvantage of not giving a completely homogeneous solution as is obtained when moist aeration is used. The amount of moisture required to convert the liquid product into the semi-solid form is usually too small to measure accurately. However, it is estimated that this amount of water varies from about 0.001 to 0.1 percent by weight of the phosphited product. After the aeration has taken place, the viscous product may be compounded immediately into a rubber or may be stored in a sealed container for future use. When the moistened product is stored in a sealed container the viscosity increases within a few hours until a stiff gum is formed.

A rubber is formed from the moistened phosphite treated product by compounding one part of this product with from 0.1 to 1 part by weight of carbon black and from about 0.05 to 0.5 part by weight of zinc oxide. The zinc oxide serves as a curing agent during the subsequent curing of the rubber. In the preferred embodiment of my invention one part of the moistened phosphite treated product is compounded with about 0.5 part by weight of carbon black and about 0.1 part by weight of zinc oxide. The compounding step may be carried out on differential rubber milling rolls by mixing the carbon black and the moistened phosphite treated product until a sticky, semi-pasty compound is formed. The zinc oxide is then added to this mixture and milling is continued until a rubbery sheet is formed which can be stripped easily from the rolls.

The rubbery sheet is then cured by pressing into the desired shape and curing at elevated temperatures. The pressing operation may be carried out in a mold maintained at room temperature or at any temperature up to about 125° C. After molding the product is cured in an oven whose temperature is gradually increased from about 100° C. to about 200° C.

The following examples are illustrative of the practice of my invention and are not intended for purposes of limitation.

*Example 1*

A methylpolysiloxane oil was prepared by mixing methyltrichlorosilane and dimethyldichlorosilane in the ratio of 0.3 mole of methyltrichlorosilane to 100 moles of dimethyldichlorosilane and hydrolyzing and condensing the hydrolyzed product. This oil was a clear colorless liquid having a low viscosity. One thousand grams of this oil and ten grams of diethyl phosphite were heated together with stirring under reflux conditions. The reaction mixture began to boil at about 176° C. and the reaction vessel temperature then dropped to about 150° C. in a period of about one hour. The temperature then began to rise slowly until it had reached 160° C. at the end of two additional hours. The reaction mixture was allowed to cool and was then distilled. Distillation was carried out until the temperature of the reaction mixture reached about 231° C. The residue was allowed to cool and moist air was bubbled through the resultant liquid for about two hours until the viscosity of the solution increased to such a point that the air was not able to penetrate the product. The aerated product was placed in a sealed container and allowed to stand overnight until a soft, sticky gum had been formed. This gum was compounded into three batches, each batch containing 40 grams of the aerated product, 20 grams of carbon black and varying amounts of zinc oxide. In each case the carbon black was milled with the gum on differential rubber milling rolls until a semi-pasty compound was formed. The zinc oxide was then added to this compound and the milling was continued until a rubbery sheet was formed. This sheet was removed from the mill and pressed at room temperature to a thickness of about 60 mils. The pressed product was then cured for twenty-four hours at 100° C., ninety-six hours at 150° C. and forty-eight hours at 200° C. The physical properties of the cured sheets are listed in the table below according to the amount of zinc oxide in the compounded rubber.

| Zinc Oxide, Grams | Tensile Strength, Lb./in.² | Percent Elongation |
|---|---|---|
| 5 | 923 | 500 |
| 10 | 733 | 500 |
| 20 | 765 | 350 |

*Example 2*

The methylsilicone oil of Example 1 was treated with 2 percent of diethyl phosphite by using one thousand grams of the oil and twenty grams of diethyl phosphite. The oil was heated to a temperature of 173° C. at which time refluxing began. Reflux continued while the temperature of the reaction vessel dropped to 148° C. The temperature then began to rise until a temperature of 172° C. was reached. At this time distillation was begun and a distillate having a temperature of 77 to 83° C. came over while the pot temperature varied from 160 to 231° C. This distillate was identified as ethyl alcohol. The phosphite treated oil was then allowed to cool and was aerated with moist air until at the end of three hours the product was so viscous that air bubbles could not make their way through. One forty gram batch of this aerated product was compounded with twenty grams of carbon black and five grams of zinc oxide by the method of Example 1 and a second batch of forty grams was compounded with twenty grams of carbon black and ten grams of zinc oxide by the same method. These compounded sheets were then pressed into sheets of about 50 to 60 mils thick and oven cured at 100° C. for twenty-four hours and then at 150° C. for forty-eight hours. The table below gives the tensile strength and percent elongation of the cured rubber.

| Zinc Oxide, Grams | Tensile Strength, Lb./in.² | Percent Elongation |
|---|---|---|
| 5 | 520 | 800 |
| 10 | 400 | 900 |

*Example 3*

One thousand grams of the methylpolysiloxane of Example 1 and thirty grams of diethyl phosphite were heated with stirring under reflux conditions for two hours. At this time distillation was begun and a distillate having a temperature of about 78° C. began coming off at a reaction vessel temperature of 166° C. After about one and one-half hours, the rate of distillation began to fall off and the vessel temperature increased to about 245° C. where a second distillate having a temperature of about 135 to 177° C. began coming off. This distillation was continued for about seven hours until a vessel temperature of 255° C. was obtained. The phosphite treated product was allowed to cool and was then aerated with moist air for about four hours. The resultant sticky gum was divided into forty gram portions and twenty grams of carbon black was added to three of these portions. Varying amounts of zinc oxide were then added to each portion in the compounding operation described in Example 1. After pressing each of the samples into 50 to 60 mil sheets they were cured for twenty hours at 100° C., for ninety-six hours at 150° C. and for forty-eight hours at 200° C. The table below lists the amount of zinc oxide in each sample and its tensile strength and percent elongation.

| Zinc Oxide, Grams | Tensile Strength, Lb./in.$^2$ | Percent Elongation |
|---|---|---|
| 5 | 952 | 400 |
| 10 | 988 | 500 |
| 20 | 815 | 400 |

Example 4

By the method of Example 1, five hundred grams of the methylpolysiloxane of Example 1 was reacted with fifty grams of diethyl phosphite. The ingredients were refluxed for two hours at a reaction vessel temperature which rose from 127 to 166° C. Distillation was then conducted over a nine and one-half hour period during which time the vessel temperature rose from 173° C. to 273° C. After cooling, the phosphite treated product was aerated with moist air for four hours to produce a semi-solid gum. Three forty gram portions of this gum were mixed with twenty grams of carbon black and varying amounts of zinc oxide. The gums were compounded as in Example 1 and pressed into sheets from 50 to 60 mils thick. These sheets were then oven cured for twenty-four hours at 100° C., ninety-six hours at 150° C. and forty-eight hours at 200° C. At the end of this curing cycle, the products had the tensile strengths and the percent elongations listed in the table below.

| Zinc Oxide, Grams | Tensile Strength, Lb./in.$^2$ | Percent Elongation |
|---|---|---|
| 5 | 615 | 250 |
| 10 | 663 | 300 |
| 20 | 554 | 300 |

Example 5

By the method of Example 1, five hundred grams of the methylpolysiloxane of Example 1 was mixed with ten grams of dimethyl phosphite and heated to form a phosphite treated silicone oil. Refluxing was carried out for two hours at a temperature of 141 to 145° C. Distillation was then allowed to proceed for three hours while the temperature of the reaction vessel rose to about 234° C. After cooling, the resulting product was aerated with moist air for about four hours to produce a semi-solid gum. By the method of Example 1, two forty gram samples of this gum were compounded with twenty grams of carbon black and varying amounts of zinc oxide. After compounding, each sample was pressed into a 50 to 60 mil sheet and cured for twenty-four hours at 100° C., ninety-six hours at 150° C. and forty-eight hours at 200° C. The tensile strength and percent elongation of these samples is listed below.

| Zinc Oxide, Grams | Tensile Strength, Lb./in.$^2$ | Percent Elongation |
|---|---|---|
| 5 | 740 | 700 |
| 10 | 680 | 800 |

Example 6

By the method of Example 1, a phosphite treated silicone oil was prepared from five hundred grams of the methylpolysiloxane of Example 1 and fifteen grams of dibutyl phosphite. Refluxing in this case was continued for two hours with the reaction vessel temperature starting at 180° C., dropping back to 162° C. and then rising to 190° C. At the end of the reflux period distillation was continued for six hours during which time the vessel temperature rose to 255° C. The resulting liquid was then allowed to cool and was aerated for about eight hours with moist air during which time a very sticky fluid was formed. Two forty gram batches of this fluid were compounded with twenty grams of carbon black and varying amounts of zinc oxide by the method of Example 1 and pressed at room temperature to sheets about 50 to 60 mils thick. These sheets were then oven cured for forty-eight hours at 100° C. and forty-eight hours at 150° C. The physical properties of these two sheets are listed below.

| Zinc Oxide, Grams | Tensile Strength, Lb./in.$^2$ | Percent Elongation |
|---|---|---|
| 5 | 530 | 700 |
| 10 | 544 | 700 |

Although the present invention has been described with reference only to methyl polysiloxane fluids, it should be understood that my process is applicable to organopolysiloxanes containing radicals other than methyl attached to silicon. For example, a gum may be prepared by the method of the present invention using an ethylpolysiloxane fluid or other siloxane fluid. In addition, there may also be aryl radicals attached directly to silicon. In the case of an organopolysiloxane fluid containing both methyl and phenyl radicals, at least fifty percent of the radicals attached to silicon should be the methyl radical.

Silicone rubber prepared by the method of the present invention is valuable in applications which utilize either the conducting property of the rubber or the high temperature property of the rubber or both of these properties. For example, this rubber may be used as a vibration damper and electrical connector between two conducting metallic members. This rubber may also be used as gasket material in applications where the high temperature stability of silicone materials are important.

What I claim as new and desire to secure by Letters Patent of the United States is:

1. The process of making a solid, elastic, curable organopolysiloxane which process comprises (1) heating a liquid methylpolysiloxane oil having an average of 1.9 to 2.0 methyl radicals per silicon atom with from 0.5 to 15 percent by weight of a dialkyl phosphite, (2) passing a gas which is moistened with water and which is inert under the conditions of the reaction through the product of (1) until a semi-solid product is formed and (3) compounding one part of the product of (2) with from 0.1 to 1 part by weight carbon black and from 0.05 to 0.5 part by weight of zinc oxide.

2. The process of claim 1 in which the dialkyl phosphite is diethyl phosphite.

3. The process of claim 1 in which the dialkyl phosphite is dimethyl phosphite.

4. The process of claim 1 in which the dialkyl phosphite is dibutyl phosphite.

5. The process of making a solid, elastic, cured organopolysiloxane which process comprises (1) heating a liquid methylpolysiloxane oil having an average of 1.9 to 2.0 methyl radicals per silicon atom with from 0.5 to 15 percent by weight of a dialkyl phosphite, (2) passing a gas which is moistened with water and which is inert under the conditions of the reaction through the product of (1) until a semi-solid product is formed and (3) compounding one part of the product of (2) with from 0.1 to 1 part by weight carbon black and from 0.05 to 0.5 part by weight of zinc oxide, and (4) curing the compounded product with heat.

6. The process of claim 5 in which the dialkyl phosphite is dimethyl phosphite.

7. The process of claim 5 in which the dialkyl phosphite is diethyl phosphite.

8. The process of claim 5 in which the dialkyl phosphite is dibutyl phosphite.

9. A solid, elastic, cured organopolysiloxane prepared by a process consisting essentially of (1) heating a liquid methylpolysiloxane oil having an average of 1.9 to 2.0 methyl radicals per silicon atom with from 0.5 to 15 percent by weight of a dialkyl phosphite, (2) passing a gas which is moistened with water and which is inert under the conditions of the reaction through the product of (1) until a semi-solid product is formed, (3) compounding one part of the product of (2) with from 0.1 to 1 part by weight of carbon black and from 0.05 to 0.5 part by weight of zinc oxide, and (4) curing the compounded product with heat.

References Cited in the file of this patent

UNITED STATES PATENTS

| | | |
|---|---|---|
| 2,571,039 | Hyde | Oct. 9, 1951 |
| 2,739,952 | Linville | Mar. 27, 1956 |
| 2,744,079 | Kilbourne et al. | May 1, 1956 |